No. 847,499. PATENTED MAR. 19, 1907.
F. O'FLAHERTY.
TOY.
APPLICATION FILED NOV. 19, 1906.
2 SHEETS—SHEET 1.
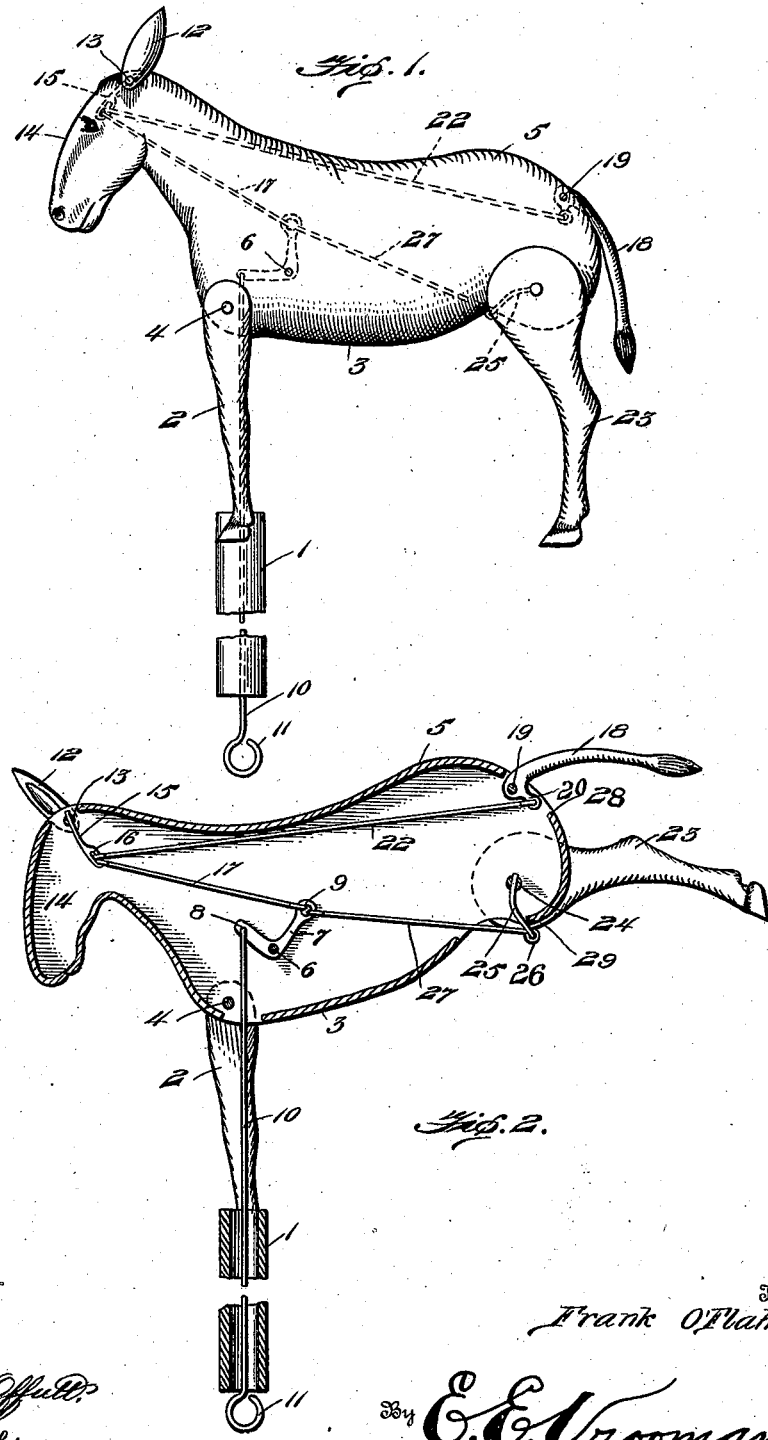
Witnesses.
B. M. Offutt.
G. M. Spring.
Inventor
Frank O'Flaherty
By E. E. Vrooman,
his Attorney.

No. 847,499. PATENTED MAR. 19, 1907.
F. O'FLAHERTY.
TOY.
APPLICATION FILED NOV. 19, 1906.
2 SHEETS—SHEET 2.
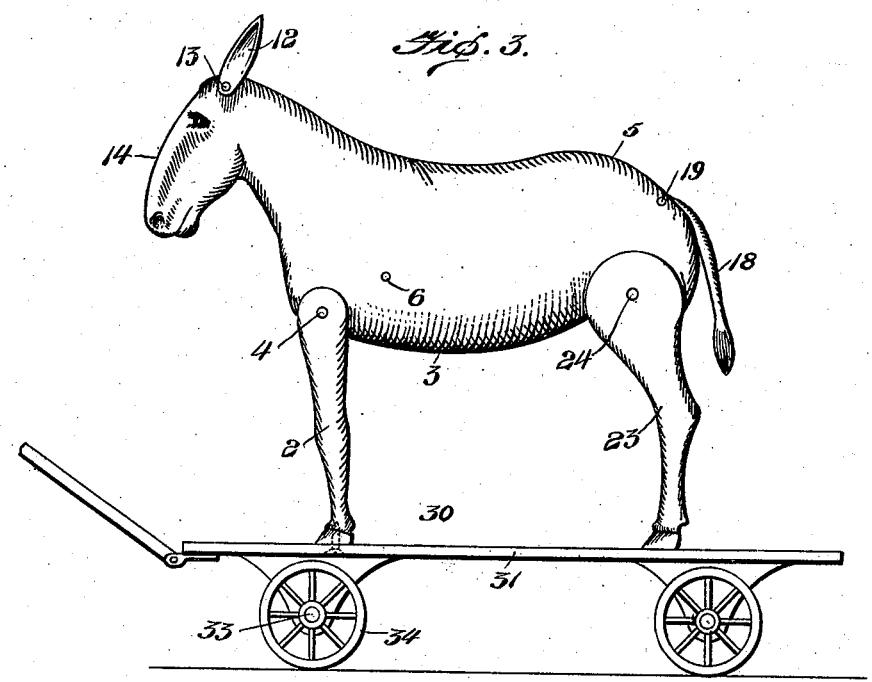
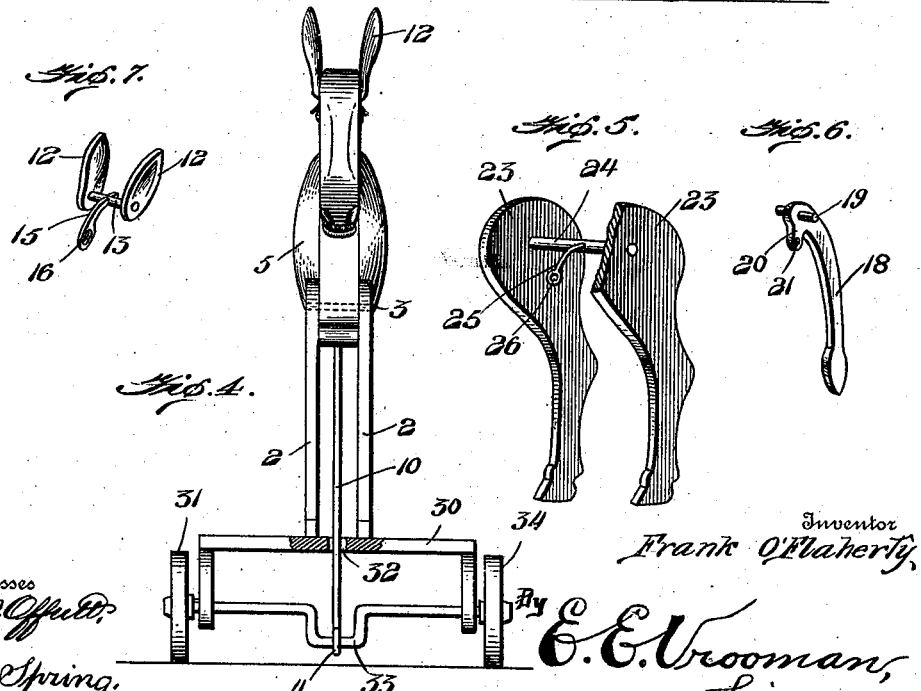
Witnesses
B. M. Offield
G. M. Spring
Inventor
Frank O'Flaherty
By E. E. Vrooman,
his Attorney.

UNITED STATES PATENT OFFICE.

FRANK O'FLAHERTY, OF FRANKLIN, PENNSYLVANIA.

TOY.

No. 847,499.  Specification of Letters Patent.  Patented March 19, 1907.

Application filed November 19, 1906. Serial No. 344,083.

*To all whom it may concern:*

Be it known that I, FRANK O'FLAHERTY, a citizen of the United States, residing at Franklin, in the county of Venango and State of Pennsylvania, have invented certain new and useful Improvements in Toys, of which the following is a specification, reference being had therein to the accompanying drawing.

This invention relates to improvements in toys, and particularly to a figure toy.

The object of the invention is the provision of means for facilitating the actuation of members or parts of a figure.

Another object of the invention is the construction of a toy which is provided with movable parts, which parts are synchronously actuated for moving the same from their normal position.

With these and other objects in view the invention consists of certain novel constructions, combinations, and arrangements of parts, as will be hereinafter fully described and claimed.

In the drawings, Figure 1 is a view in side elevation of a toy constructed in accordance with the present invention. The movable parts of said toy are in their normal position. Fig. 2 is a longitudinal sectional view of the toy depicted in Fig. 1 and showing the parts in the position they assume when actuated. Fig. 3 is a view in side elevation of the toy depicted in Figs. 1 and 2, except that in this embodiment the figure or animal is carried by a wheeled support—as, for instance, a wagon. Fig. 4 is a front view in elevation of the embodiment depicted in Fig. 3, part of the wagon-body being shown in section. Fig. 5 is a perspective view of the hind legs and the coöperating parts of the animal. Fig. 6 is a perspective view of the tail, and Fig. 7 is a perspective view of the ears.

Referring particularly to Figs. 1 and 2, the support 1 in this embodiment constitutes a tubular or hollow handle, to one end of which is fixedly secured the front legs 2 of the animal or figure 3. The figure or animal 3 is represented in this instance as a mule. The front legs 2 are connected by a horizontal shaft 4, upon which shaft 4 the body 5 of the animal is pivotally mounted. The body 5 of the animal 3 is preferably hollow, so that the actuating device for the movable members hereinafter described can be placed therein. A horizontal shaft 6 is carried by the body 5, and positioned within the body 5 and mounted upon said shaft 6 is a bell-crank lever 7. The bell-crank lever is provided with an aperture 8 near one end and with an aperture 9 near its opposite end. An actuating shaft or plunger 10 is slidably mounted in the support or handle 1 and extends between the front legs 2 and is positioned at its upper end in the aperture 8 of bell-crank lever 7 and fixedly secured to said crank. The lower end of said shaft or plunger 10 is preferably provided with a loop or grip 11. Ears 12 of the animal 3 are fixedly secured to a horizontal shaft 13. The shaft 13 is rotatably mounted upon the head 14 of the animal 3. A depending arm 15 is fixedly secured near one end to shaft 13, and formed in said arm 15, near its opposite end, is preferably an elongated slot 16. A rod 17 is positioned at one end in the elongated slot 16 of arm 15 and at its opposite end in the aperture 9 of bell-crank lever 7. The tail 18 of the animal or figure 3 is fixedly secured to a horizontal shaft 19, which shaft 19 is rotatably mounted upon the body 5. Integral with the tail 18 is a depending extension 20, which extension 20 is provided with an aperture 21 near its lower end. A rod 22 is secured at one end within the aperture 16 of arm 15 and at its opposite end within the aperture 21 of the extension 20, thereby directly connecting the ears 12 to tail 18. The hind legs 23 of the animal are fixedly secured to a horizontal shaft 24, which shaft 24 is rotatably mounted upon the body 5. Intermediate the ends of shaft 24 is fixedly secured a curved arm 25, which arm is provided near its lower end with an aperture 26. A rod 27 is secured at one end within the aperture 9 of bell-crank 7 and at its opposite end in the aperture 26 of arm 25. When it is desired to actuate the movable parts of the toy-body in Figs. 1 and 2, the operator grasps the handle 1 with one hand and with the other hand reciprocates the plunger 10 within said handle, thereby pivoting bell-crank lever 7, which will consequently impart rotary movement to shafts 13, 19, and 24, which will swing the ears, tail, and hind legs to different positions. When the bell-crank lever 7 is actuated, synchronous movement will be imparted to all of the movable parts or members. When the tail 18 is in its normal position, it will rest against a portion 28 of the body. Before bell-crank lever 7 has been swung as far as possible upon shaft 6 arm 25 will engage portion 29 of the body 5, and thereby body 5 will be swung upwardly on shaft 4.

In Figs. 3 and 4 I have shown the front legs 2 in engagement with a movable support, preferably a wagon 30. The legs are fixedly secured by any suitable means to the wagon bed or body 31. The shaft or plunger 10 is positioned within an aperture or elongated slot 32, and the loop 11 is in engagement with a crank-shaft 33, to which shaft 33 are fixedly secured wheels 34. When rotary movement is imparted to the crank-shaft 33, the shaft or plunger 10 will be reciprocated, and thereby actuate the movable parts or members of the figure or animal 3. When the shaft or plunger 10 is drawn or pulled downward, the hind legs, tail, and ears will be moved to their normal position, as in Fig. 1, but upon upward pressure being exerted upon the shaft or plunger 10 the hind legs and tail will be thrown upwardly, and as pressure is continued upon shaft 10 the body will also be swung upward, while the ears 12 will be thrown forward. As hereinbefore stated, the hind legs, tail, and ears are synchronously actuated, and the body is subsequently pivoted upon the front legs. In both of the embodiments the front legs are fixedly secured to a support, and the same principle of operation of the shaft or plunger 10 is involved in both embodiments.

What I claim is—

1. In a device of the character described, the combination with a support, of a body movably mounted upon said support, a lever movably mounted upon said body, a leg movably mounted upon said body, means connecting said lever to said leg, an ear movably mounted upon said body, means connecting said ear to said lever, a tail movably mounted upon said body, means connecting said tail to said ear, and means for imparting movement to said lever, whereby said leg, ear, and tail are synchronously actuated for moving the same upon said body.

2. In a device of the character described, the combination with a support, of a body pivotally mounted upon said support, an ear pivotally mounted upon said body, a tail pivotally mounted upon said body, a leg pivotally mounted upon said body, and means for synchronously swinging said ear, tail, and leg upon said body, and swinging said body upon said support, when the ear, tail, and leg have reached the limit of their movement.

3. In a device of the character described, the combination of a pair of stationary front legs, a body pivotally mounted between said front legs, an ear pivotally mounted upon said body and adapted to swing forward, a leg pivotally mounted upon said body and adapted to be swung upward, means for moving said body upon the front legs and swinging its rear portion upwardly, and means for synchronously swinging said ear forwardly and said pivoted leg upwardly.

4. In a device of the character described, the combination with a support, of a pair of stationary legs fixedly secured to said support, a body pivotally mounted between said legs, a pair of legs pivotally mounted upon said body, and means for swinging said last-mentioned legs upwardly and swinging said body upon said first-mentioned legs.

5. In a device of the character described, the combination with a body, of ears positioned upon opposite sides of said body, a shaft connecting said ears, an arm fixedly secured to said shaft, a shaft journaled upon said body, a tail fixedly secured to said shaft, a depending extension secured to said tail, a rod connecting said arm and depending extension, and means connected to said arm and being capable of swinging the same for synchronously actuating said ears and tail.

6. In a device of the character described, the combination of a movable body, a pair of hind legs carried by said body, an arm, means connecting said arm to said legs, said arm extending through a portion of said body and adapted to limit upward movement of said legs, and means for swinging said arm, and thereby imparting movement to said hind legs and, subsequently, to said body.

7. In a device of the character described, the combination with a body, of a movable ear carried by said body, a movable leg carried by said body, a movable tail carried by said body, a bell-crank lever carried by said body, means connecting said lever to said ear and to said leg, and means connecting the tail to said ear, whereby when movement is imparted to said lever, similar movement will be imparted to said ear, tail, and leg.

8. In a device of the character described, the combination with a support, of a body pivotally mounted upon said support, a bell-crank lever positioned within and pivotally mounted upon said body, a shaft secured at one of its ends to said bell-crank lever, a loop formed upon the opposite end of said shaft, a shaft, an ear fixedly secured to said shaft, an arm fixedly secured to said shaft, and a rod connecting said bell-cank lever and arm.

9. In a device of the character described, the combination with a body, of a bell-crank lever pivotally mounted upon said body, a series of members provided with depending portions or extensions, pivotally mounted upon said body, and means connecting said bell-crank lever to said extensions, whereby when said lever is actuated, synchronous movement will be imparted to said members.

10. In a toy, the combination with a horizontal body, a movable ear mounted upon said body, a movable tail mounted upon said body, of a horizontal rod positioned longitudinally of said body, means connecting one end of said rod to said ear, means connecting the opposite end of said rod to said tail, a lever, means connecting said lever to said rod, and means for actuating said lever for imparting movement to said rod and to said tail and ear.

11. In a toy, the combination with a body provided with an opening, a movable member carried by said body, of an arm extending downwardly through said opening, means connecting said arm to said movable member, lever means carried by said body, means connecting said lever means to said arm, and means for actuating said lever means for moving said movable member upon said body.

12. In a toy, the combination with a body, a movable member carried by said body and extending beyond the same, said body provided with an opening, of an arm extending through said opening, means connecting the inner end of said arm to said movable member, lever means connected to the outer end of said arm, and means for actuating said lever for imparting movement to said movable member.

13. In a toy, the combination with a support, a stationary leg fixedly secured to said support, of a body pivotally mounted near one end upon said stationary leg, a movable member carried by said body and extending beyond the same, lever means in said body, means connecting said lever means to said movable member, whereby when said lever means is actuated, said movable member will be swung upon said body and subsequently said body upon said stationary leg.

14. In a toy, the combination with a body, of a movable member carried by said body and extending beyond the same, a bell-crank lever pivotally mounted on said body, a rod connected at one of its ends to one end of the bell-crank lever, and means connecting the opposite end of said rod to said movable member, and a vertically-movable rod connected at its upper end directly to the opposite end of said bell-crank lever, whereby when said rod is reciprocated, said movable member will be swung upon said body.

In testimony whereof I hereunto affix my signature in presence of two witnesses.

FRANK O'FLAHERTY.

Witnesses:
  Mrs. FRANK O'FLAHERTY,
  HENRY A. O'FLAHERTY.